(12) United States Patent
Simpson et al.

(10) Patent No.: US 8,342,916 B2
(45) Date of Patent: Jan. 1, 2013

(54) MEAT PROCESSING ASSEMBLY

(75) Inventors: Michael S. Simpson, Norwalk, IA (US); Kenneth B. Arnote, Albion, IA (US)

(73) Assignee: Stork Townsend Inc., Des Moines, IA (US)

( * ) Notice: Subject to any disclaimer, the term of this patent is extended or adjusted under 35 U.S.C. 154(b) by 335 days.

(21) Appl. No.: 12/732,391

(22) Filed: Mar. 26, 2010

(65) Prior Publication Data

US 2011/0097980 A1  Apr. 28, 2011

Related U.S. Application Data

(60) Provisional application No. 61/254,918, filed on Oct. 26, 2009.

(51) Int. Cl.
*A22C 11/00* (2006.01)
(52) U.S. Cl. .......................................................... 452/31
(58) Field of Classification Search ............... 452/30, 452/31
See application file for complete search history.

(56) References Cited

U.S. PATENT DOCUMENTS

| | | | |
|---|---|---|---|
| 2,772,638 A | 9/1950 | Nagely | |
| 3,059,584 A | 1/1960 | Cottell | |
| 4,218,003 A * | 8/1980 | Plewa et al. ..................... | 452/31 |
| 4,584,740 A | 4/1986 | Townsend | |
| 5,197,915 A * | 3/1993 | Nakamura et al. .............. | 452/51 |
| 5,709,600 A | 1/1998 | Xie et al. | |
| 5,813,907 A | 9/1998 | Lebsack et al. | |
| 5,830,051 A | 11/1998 | Kasai et al. | |
| 5,842,914 A | 12/1998 | Vermeer et al. | |
| 5,921,857 A | 7/1999 | Simpson | |
| 5,951,391 A | 9/1999 | Hergott et al. | |
| 5,971,842 A | 10/1999 | Simpson et al. | |
| 6,013,295 A | 1/2000 | Kobussen et al. | |
| 6,056,635 A | 5/2000 | Vermeer et al. | |
| 6,056,636 A | 5/2000 | Cody et al. | |
| 6,066,035 A | 5/2000 | Hergott et al. | |
| 6,083,093 A * | 7/2000 | Williams ......................... | 452/51 |
| 6,125,991 A | 10/2000 | Veldkamp et al. | |
| 6,206,667 B1 | 3/2001 | Turner, Jr. et al. | |
| 6,213,368 B1 * | 4/2001 | Vermeer et al. ................ | 226/104 |
| 6,234,891 B1 | 5/2001 | Klaassen | |
| 6,245,369 B1 * | 6/2001 | Kobussen et al. .............. | 426/231 |
| 6,325,711 B1 | 12/2001 | Bruinsma et al. | |
| 6,467,668 B1 | 10/2002 | Basile, II et al. | |
| 6,494,311 B2 * | 12/2002 | Muller ............................ | 198/607 |
| 6,855,046 B2 | 2/2005 | Cate et al. | |

(Continued)

FOREIGN PATENT DOCUMENTS

DE   10 2007 025 583 A1   1/2008

(Continued)

OTHER PUBLICATIONS

Rush Gears.Com, Technical Information about Helical Gears, 90th Anniversary, Fort Washington, PA 19034.

*Primary Examiner* — David Parsley
(74) *Attorney, Agent, or Firm* — Zarley Law Firm, P.L.C.

(57) ABSTRACT

An improved processing assembly having a meat emulsion pump connected to a stuffing horn. The stuffing horn positioned to fill casings with meat emulsion which form a strand of processed meat that is received by a twister, then a linker, and subsequently deposited on a conveyor.

12 Claims, 16 Drawing Sheets

| U.S. PATENT DOCUMENTS | | | | FOREIGN PATENT DOCUMENTS | | |
|---|---|---|---|---|---|---|
| 6,981,912 B2 | 1/2006 | Cate et al. | | EP | 0 395 177 A2 | 10/1990 |
| 7,033,264 B1 | 4/2006 | Cate et al. | | EP | 0 399 582 A2 | 11/1990 |
| 7,160,184 B1 | 1/2007 | Lebsack et al. | | EP | 0 451 684 A1 | 10/1991 |
| 7,198,563 B2 | 4/2007 | Bergman et al. | | EP | 0 507 280 A1 | 10/1992 |
| 2002/0220605 | 2/2002 | Muller | | GB | 485 876 A | 5/1938 |
| 2002/0137451 A1 | 9/2002 | Kasai et al. | | | | |
| 2006/0105690 A1 | 5/2006 | Wince et al. | | * cited by examiner | | |

US 8,342,916 B2

MEAT PROCESSING ASSEMBLY

CROSS REFERENCE TO RELATED APPLICATION

This application claims the benefit of U.S. Provisional Application No. 61/254,918 filed Oct. 26, 2009.

BACKGROUND OF THE INVENTION

This invention is directed toward a meat processing assembly and more specifically to improvements for the meat pump, the stuffing horn, the twister, the linker, and the conveyor.

Meat processing assemblies are known in the art and over the years improvements have been made to enhance speed and efficiency when making linked meat products. Despite these improvements, deficiencies still exist. For example, removing gears from a meat pump remains a difficult time consuming process. With the twister, the use of a seal is still susceptible to wear and does not maximize heat reduction. To adjust the linker for different products require separate linker heads. Finally, aligning the conveyor with the linker can be difficult particularly when the floor is uneven. Therefore, a need exists in the art for a meat processing assembly that addresses these deficiencies.

An object of the invention is to provide a pump that allows for the easy installation and removal of the gears.

Another object of the invention is to provide for the easy adjustment of the stuffing horn for different casing types.

A further objective of the present invention is to provide for the easy adjustment, installation, and removal of chains on a linker for use with different length sausages.

Another object of the invention is to provide a linker that maintains constant tension in the linking chains.

Yet another object of the present invention is to provide an adjustable chain spacing of a linker to eliminate backing plates, different sprocket sizes, and different shaft spacing.

A still further objective of the present invention is to provide an adjustable conveyor that may be fixed to a floor.

These and other objectives will be apparent to one of skill in the art based upon the following disclosure.

SUMMARY OF THE INVENTION

A meat processing assembly having an improved meat emulsion pump that allows for easier installation and removal of gears within a pump housing. A horn adjustment assembly that permits the position of a stuffing horn to be adjusted to eliminate the need for removing and replacing stuffing horns of different lengths for use with different casing materials. An improved twister that reduces heat through use of a non-contact bearing isolator that shields the bearing from the exterior environment. An improved linker that, through use of pistons connected to idler sprockets, self-adjusts the linker assembly for different recipes and the easy removal and replacement of linker chains and constant tension on the chains. The spacing is also adjustable for different calibers and eliminates the need for adjustable backing plates, sprocket sizes, and shaft spacings. A process control system that permits links to be counted and controlled based on sensed data. Finally, an improved conveyor that is adjustable to provide for easy positioning of the looper of the conveyor with the output end of the linker while maintaining a fixed base.

DETAILED DESCRIPTION OF THE PREFERRED EMBODIMENT

Figure 1:
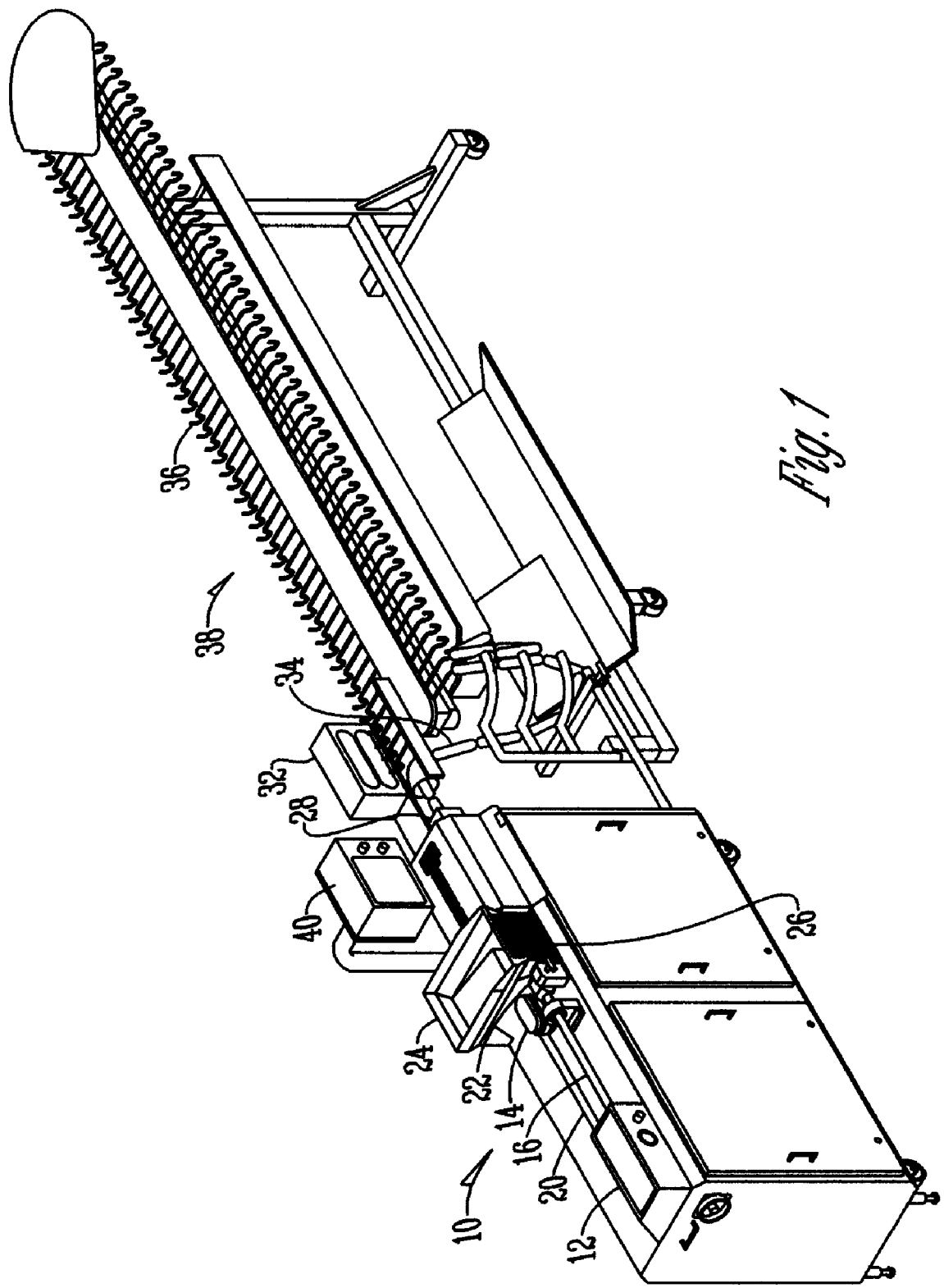
FIG. 1 is a perspective view of a meat processing assembly.
Figure 2:
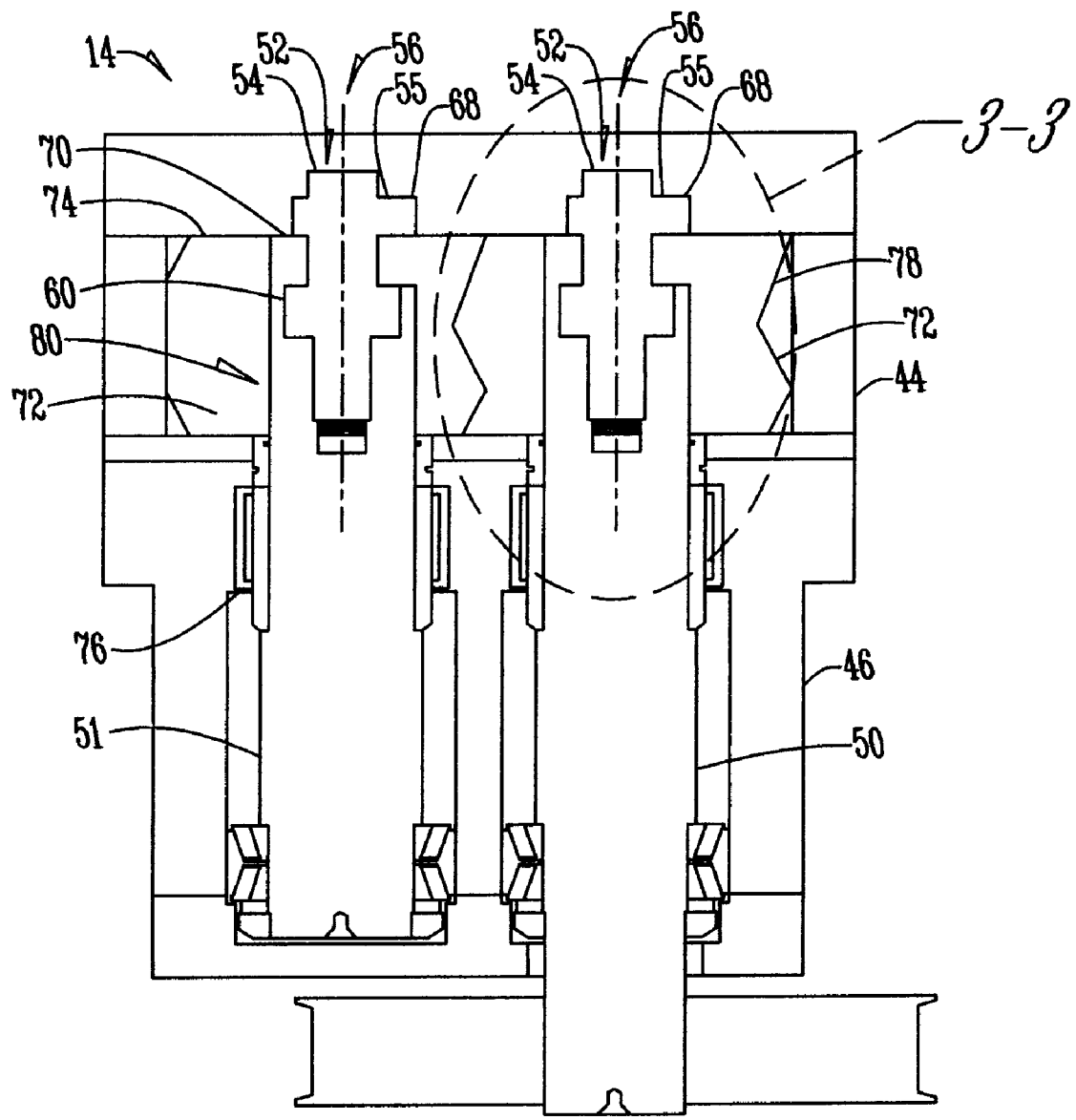
FIG. 2 is a side plan sectional view of the pump.
Figure 3:
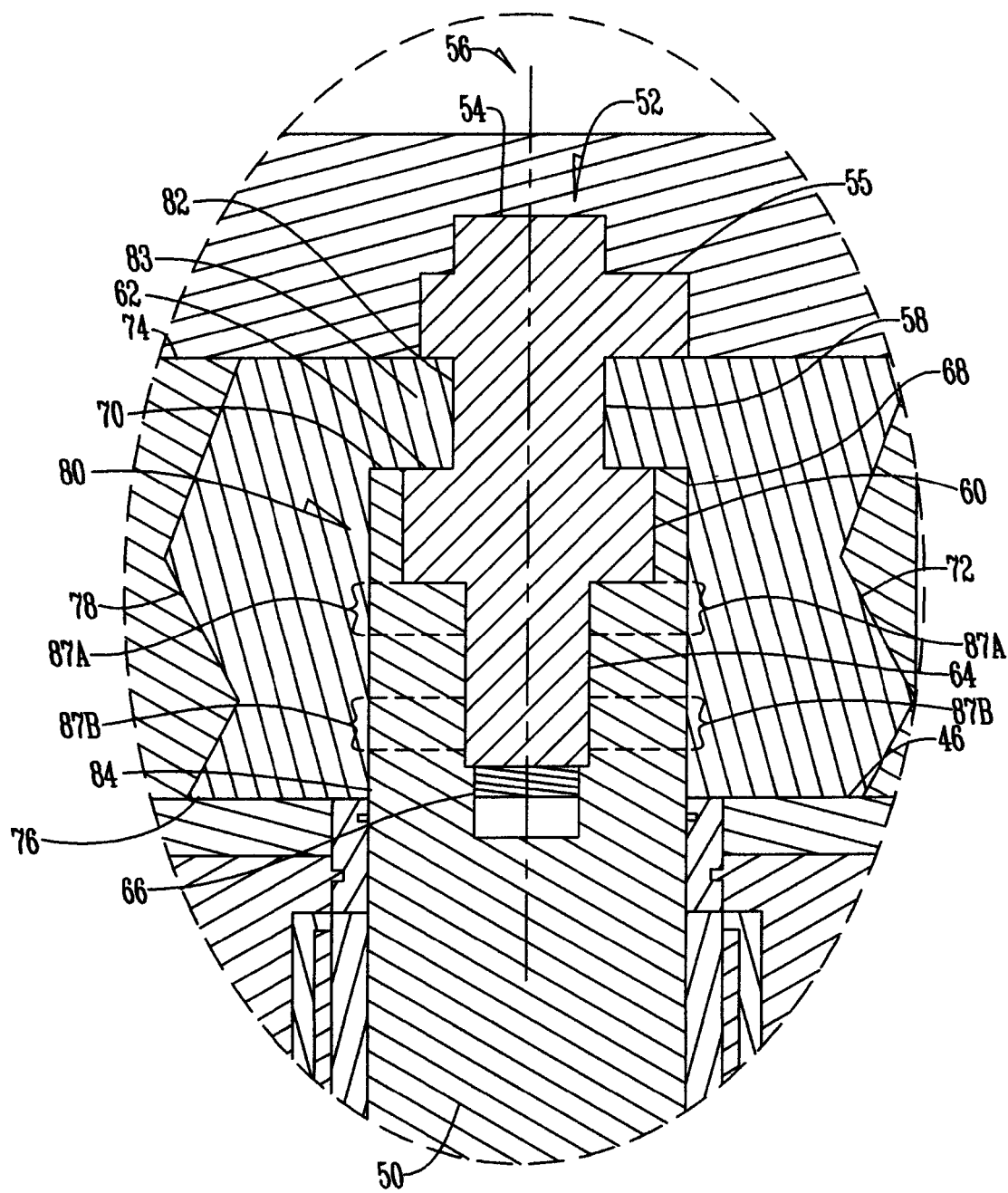
FIG. 3 is a side plan sectional view of the pump.
Figure 4:
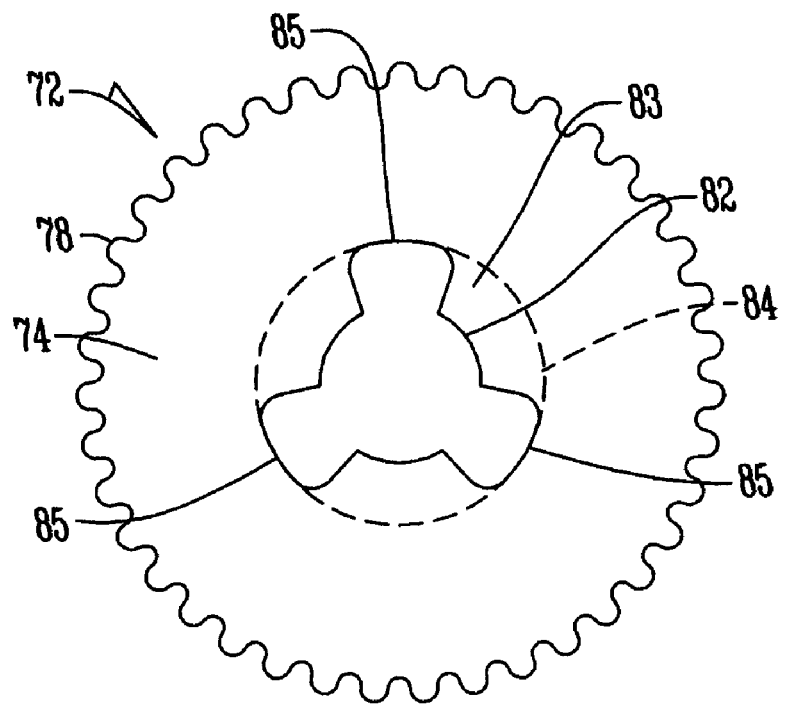
FIG. 4 is a top plan view of the pump helical gear.
Figure 5:
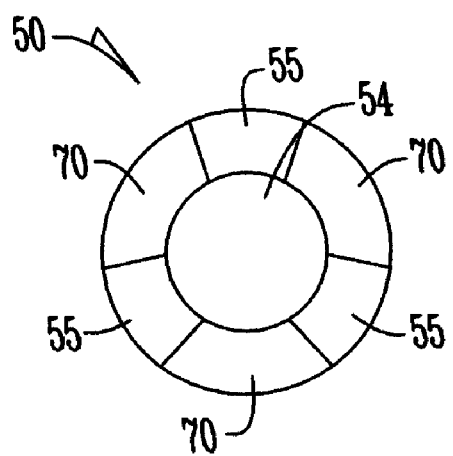
FIG. 5 is a top plan view of the pump shaft.
Figure 6:
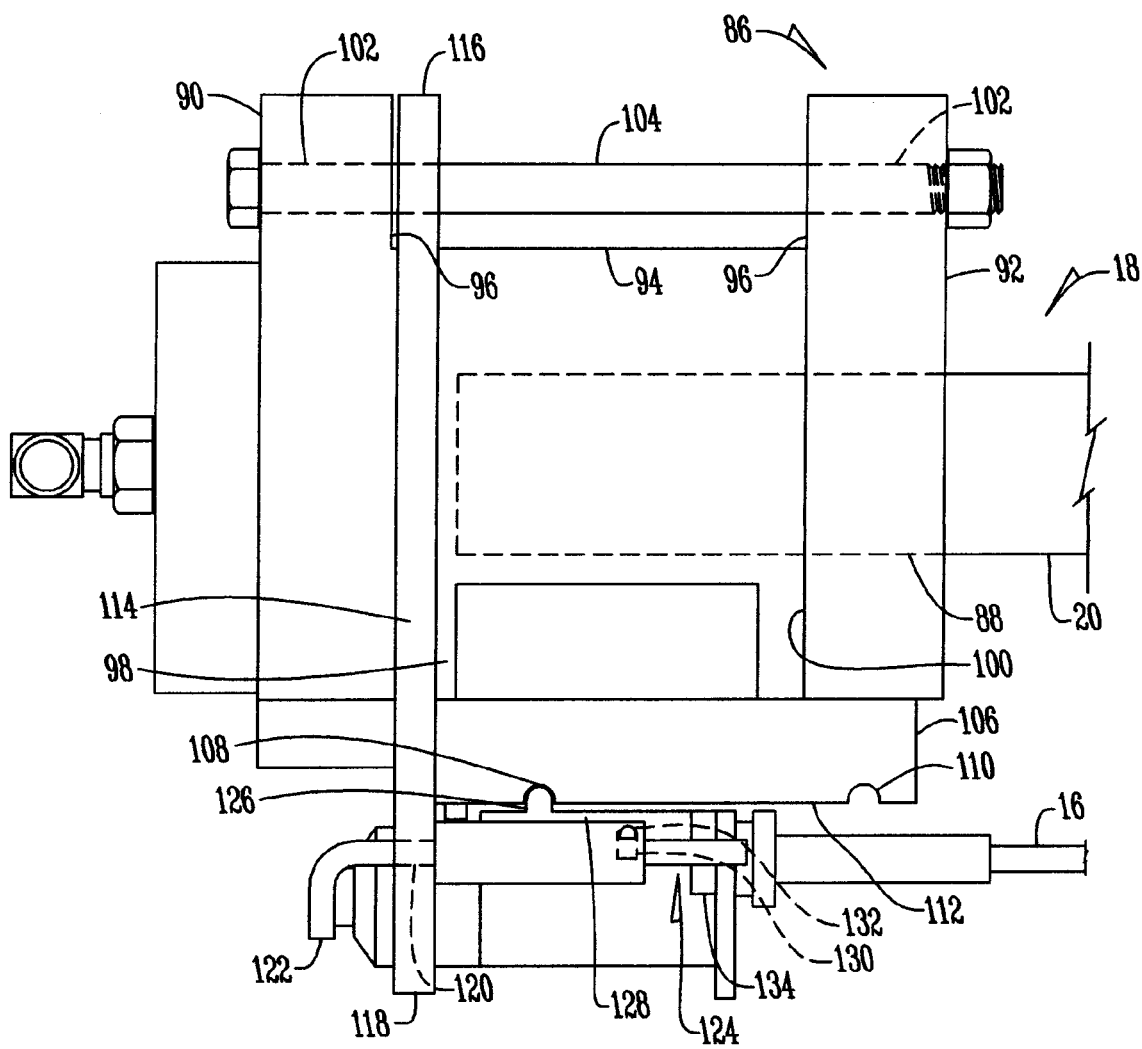
FIG. 6 is a front plan view of the horn adjustment assembly.
Figure 7:
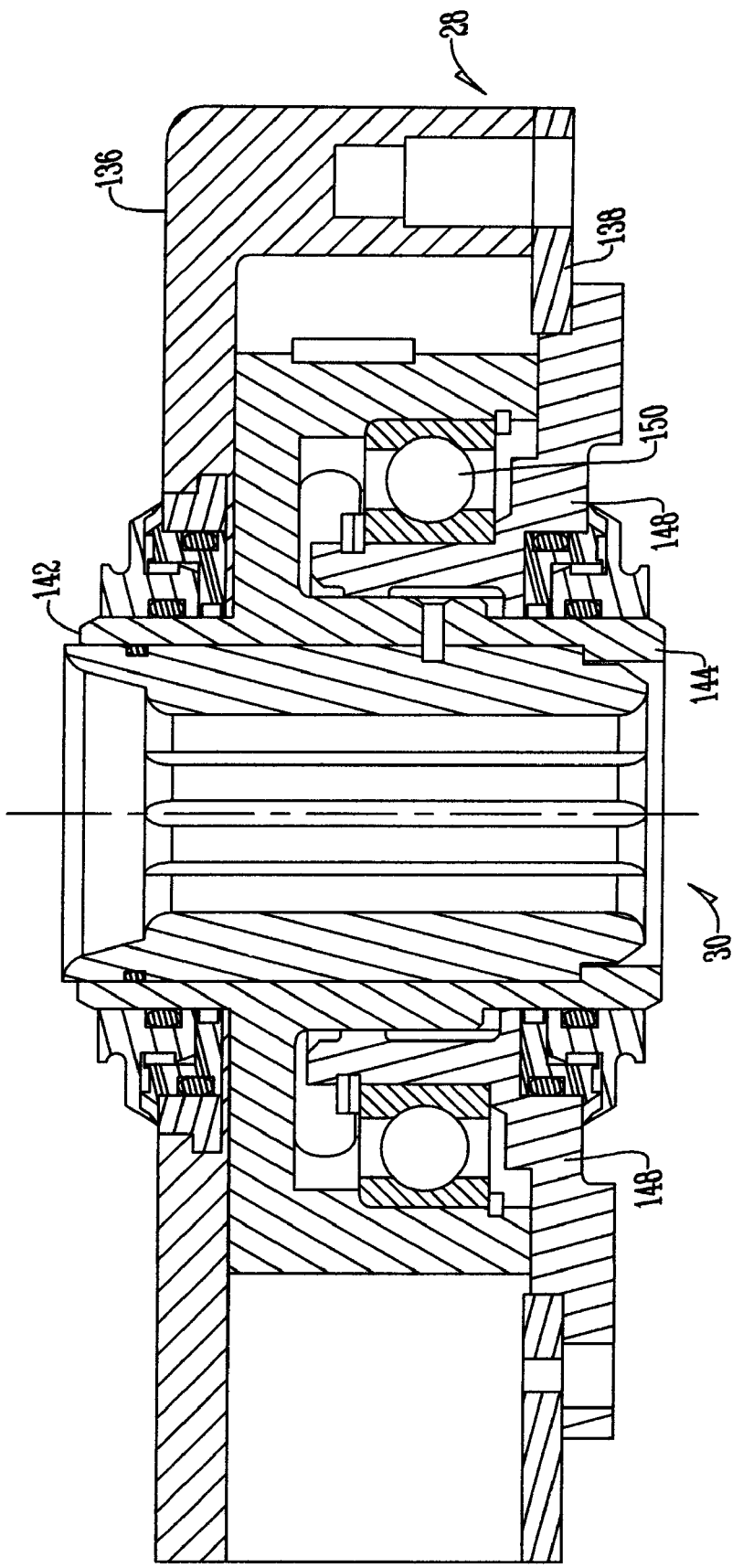
FIG. 7 is a side sectional view of the chuck.

Referring to the Figures, the meat processing assembly 10 has a frame 12 with a meat emulsion pump 14 connected to a source of meat emulsion (not shown). A stuffing horn 16 is slidably and operably connected to the pump 14 and is longitudinally moveable by a horn adjustment assembly 18 that is slidably mounted to guide shaft or cylinder carriage 20. An elongated shirred casing 22 is mounted on horn 16 from casing hopper 24 where the forward end of the horn 16 terminates at casing filling station 26 adjacent twister housing 28. The twister 28 has a hollow rotatable chuck 30 which receives filled casing 22 and rotates the casing 22 before the filled casing moves into linker 32. The completed strands of sausage 34 exit the linker 32 and are deposited on hooks 36 of conveyor 38. The foregoing components are connected to and controlled by computer control 40.

Pump 14 has a gear housing 44, a pump housing weldment 46, and a pulley driven drive shaft 50 that extends through a bore in the weldment 46 along with an idler shaft 51. Attached to the drive and idlers shafts 50 and 51, and disposed within gear housing 44, is a pair of gear locks 52. The gear locks 52 have a head 54 with a plurality of protrusions 55 that extend outwardly from a central axis 56 of the lock 52. Below the head 54 is a channel or groove 58 that separates the head 54 from the body 60 of the lock 52. The body 60 has a diameter greater than the channel 58 such that it forms a shoulder 62. Extending from the body 60 is a stem 64 that has a threaded end 66. The threaded end 66 of the lock 52 is matingly received by a threaded bore in the shaft 50.

The top end of the shaft 50 has a plurality of protrusions 68 that extend upwardly and are positioned around the outer perimeter of the shaft such that gaps or grooves 70 are formed therebetween. A pair of helical gears 72 are removably mounted to the shafts 50 and 51 and secured with the locks 52. The gears 72 have a top surface 74, a bottom surface 76, and a plurality of helically formed teeth 78 on the outer perimeter of the gear 72. Centrally disposed through the gear 72 is a bore 80. The bore 80 has a first section 82 that extends from the top surface 74 to a shelf 83 and a second section 84 that extends from the shelf 83 to the bottom surface 76. The diameter of the second section 84 of the bore 80 is slightly larger than the diameter of the shaft 50. The diameter of the first section 82 of the bore 80 is slightly larger than the diameter of the channel 58 on the gear lock 52. The shelf 83 has a plurality of openings 85 that align with the protrusions 55 on the head 54 to form a key slot. A top band 85A and a bottom band 85B are located on the second section 84 of the bore 80 and have a non-contact area therebetween. The bands 85A and 85B fit within steps 87A and 87B on the outer surface of the shaft 50. This allows the gear to become free when jacked-up about 6 mm.

To mount the gears 72 on the shafts 50, the gear 72 is placed over the head 54 of the gear lock 52 and the gear 72 is rotated such that the openings 85 are aligned with protrusions 55. In addition, the protrusions 55 are aligned with protrusions 68 of the drive shaft 50. Once aligned, the gear is placed over the head 54 of the gear lock 52 such that the shelf 83 of the gear 72 fit within the gaps 70 of the shaft 50 and engage shoulder 62 of the body 60 of the gear lock 52. In this position, both the gear 72 and the gear lock 52 are in a raised position in relation to shaft 50. To lower the gear 72, the gear lock 52 is rotated such that the threaded end 66 of stem 64 is matingly received in the threaded bore of shaft 50. As the gear lock 52 is lowered so to is the gear 72. To lock the gear 72 in place, the gear lock 52 is rotated to a position such that the protrusions 55 cover and are vertically aligned with the shelf 82 of the gear 72 preventing vertical movement of the gear 72. Once rotated into position, the gear drops part way onto the shaft until bands 85A and 85B contact steps 87A and 87B. At this point the top of the gear 72 is just below protrusions 55. Rotating the lock 52 forces the gear 72 down and bands 85A and 85B into full engagement with steps 87A and 87B. The bores in the gears 72 and the exterior surface of shafts 50 are stepped such that engagement occurs only over a short vertical distance.

To remove the gear 72, the gear lock 52 is rotated the opposite direction, thus raising the gear 72 and the gear lock 52 in relation to the shaft 50 and the weldment 46. Once raised, the protrusions 55 are aligned with openings 85 and the gear 72 is lifted over and off the gear lock 52. The gear 72 and shaft 50 are thus stepped so that engagement occurs at the top and a bottom of the gear 72 (at 62), allowing for minimum vertical movement of the gear in relation to the shaft 50 when removing the gear, as well as a tighter fit between gear and shaft without causing jams. Thus, a simplified pump has been shown where it is easier to assemble and remove the gear.

The horn adjustment assembly 18 is attached to a cylinder carriage 20 and stuffing horn 16. The assembly 18 has a positioning member 86 that is slidably mounted to the cylinder shaft 20 through a generally centrally located bore 88. The positioning member 86 is of any size and shape and preferably is a single piece of machinable composite material having a first section or end 90, a second section or end 92, and a channel 94 disposed inbetween and forming shoulders 96 on both the first and second sections 90, 92. Cut within the channel 94 are at least two grooves 98, 100 that preferably are aligned parallel to the shoulders 96. The first and second sections 90, 92 have apertures 102 positioned above the channel 94 in spaced alignment that receive a pivot pin 104. A flange 106 extends from the bottom of the positioning member 86 and has at least two slots 108, 110 formed in the bottom edge 112 of the flange 106.

A lever 114 having a first end 116 and a second end 118 is rotatably mounted to the pivot pin 104 at the first end 116 and the stuffing horn 16 at the second end 118. The lever 114 is formed to fit within the grooves 98, 100 on the positioning member 86. Positioned adjacent the second end 118 is an aperture 120 that receives a locking pin 122.

Mounted rotatably about the stuffing horn 16 is a locking bracket 124. The locking bracket 124 has a locking member 126 that extends outwardly and transversely to a central section 128. The locking member 126 is formed and positioned to fit within slots 108, 110 on the bottom flange 106 of the positioning member 86. The central section 128 preferably is a hollow cylindrical tube that attaches to the stuffing horn 16 and has a cam slot 130 that receives a cam follower 132 attached to the lever 114. Extending outwardly and transversely from the central section 128 is an arm 134. The arm 134 is positioned such that it will disable rotation of the locking member 126.

When in a first locked position, the lever 114 is received in the first groove 98 of the positioning member 86, the locking member 126 is received in the first slot 108 of the flange 106, and the arm 134 engages the locking pin 124 to prevent rotation of the locking member 126 out of the slot 108. To unlock, the locking pin 124 is retracted such that it does not engage the arm 134 and the locking bracket 124 is permitted to rotate about the stuffing horn 16 such that the locking member 126 is removed from the slot 108. The cam slot 130 and cam follower 132 limit the amount of rotation of the locking bracket 124. Once the locking bracket 124 is released, the lever 114, along with the stuffing horn 16 and locking bracket 124, are raised such that the lever 114 is removed from the first groove 98. In locking the horn 16 into the carriage 20, the cam action forces locking bracket 124 to act on a flange 125 on the horn 16 forcing a cone shaped boss 127 on the rear end of the horn 16 into a cone shaped receptacle 129 held by a bearing 131 within the lever assembly. In doing so, the horn 16 is positioned and secured, but free to rotate. Also pin 104 is threaded into the lever 116, but free to move back and forth within holes in the carriage sections 90 and 92. After removal, the lever 114 is slid along a pivot pin 104, aligned with the second groove 100, and then lowered to be received within the second groove 100. The locking pin 124 is then retracted to permit the locking bracket 124 to be rotated back to a second locked position where the locking member 126 is received in the second slot 110. The locking pin 124 is then released to engage the arm 134 and hold the locking bracket 124 in a second locked position. This arrangement provides the advantage of being able to easily and quickly adjust the effective length of the stuffing horn 16 with respect to the positioning member 86 without having to remove and replace stuffing horns 16 having different lengths.

Although the above describes a first locked position and a second locked position, additional locked positions are contemplated such as a third, fourth and so on. The same teaching above can be extrapolated by one of ordinary skill in the art to accomplish a countless number of locked positions.

The twisting housing 28 includes a first housing section 136 and a second housing section 138 that are matingly held together by suitable screws or bolts 139 in aligned threaded apertures 139A.

A pulley 142 includes a sleeve 144 and extends outwardly to engage the second housing member 138. Bearing isolators 148 extend around sleeve 144. Bearing 150 is mounted within housing 28 and is shielded from chuck 30 by the bearing isolator 148. By isolating the bearing 150 away from chuck 30, significantly less heat is produced as the bearing isolator 148 is non-contact.

The linker 32 has a pair of linker chain assemblies 152 that are positioned in vertical alignment with one another. Each assembly 152 has a pair of sprockets 154 or pulleys with at least one sprocket connected to and driven by a motor (not shown). The sprockets include an extension 156 that includes an alignment slot 158. The second, or idler sprocket 154A is connected to a piston 160 that extends between the sprockets 154. The piston 160 is of any type and preferably is pneumatic and is connected to a source of compressed air (not shown). Also, preferably the piston 160 is telescopic wherein a first section 160A slides within a second section 160B when extended or retracted. Each assembly 152 is mounted to a support member 162.

Figure 8:
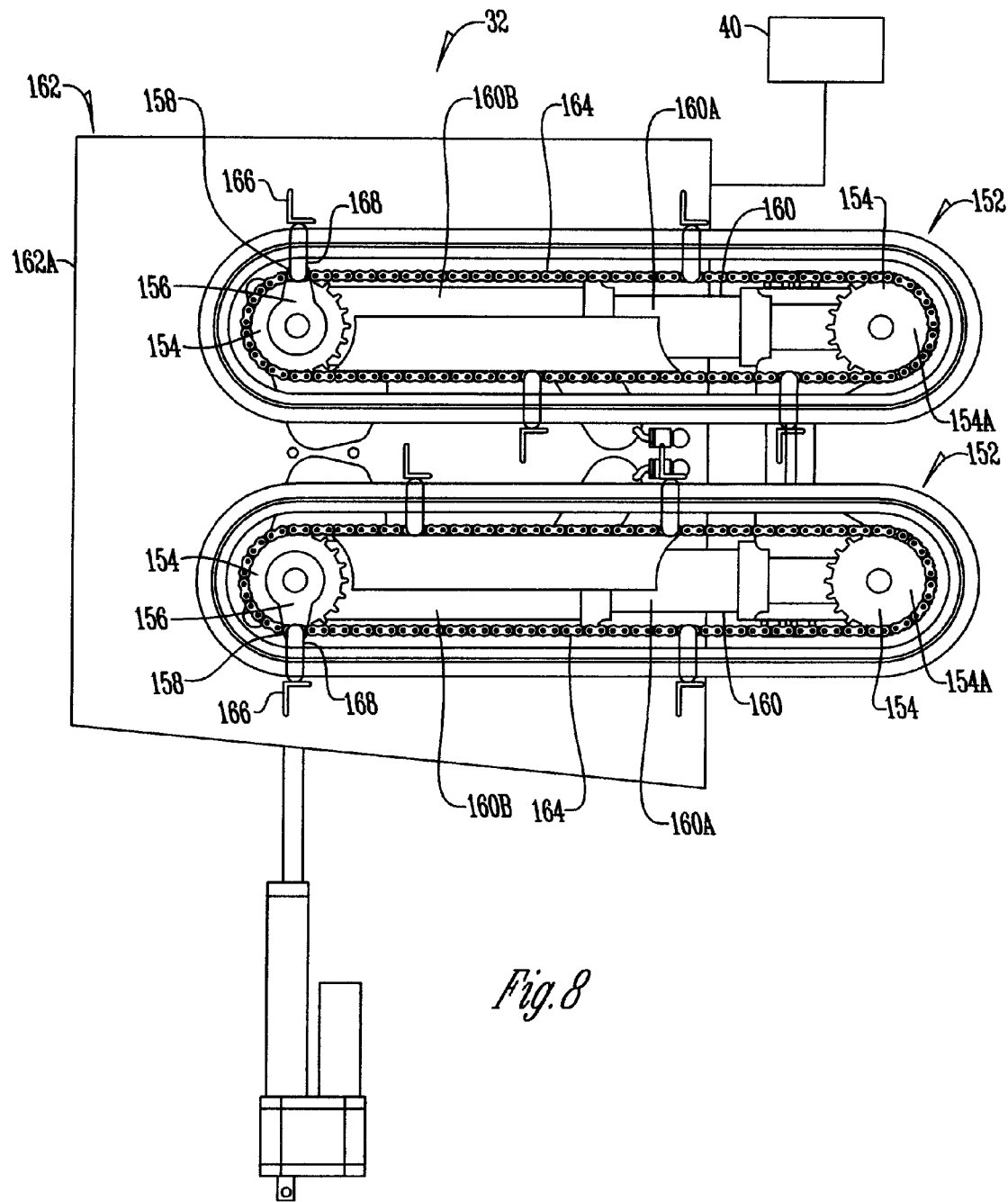
FIG. 8 is a side plan view of the linker.
Figure 8A:
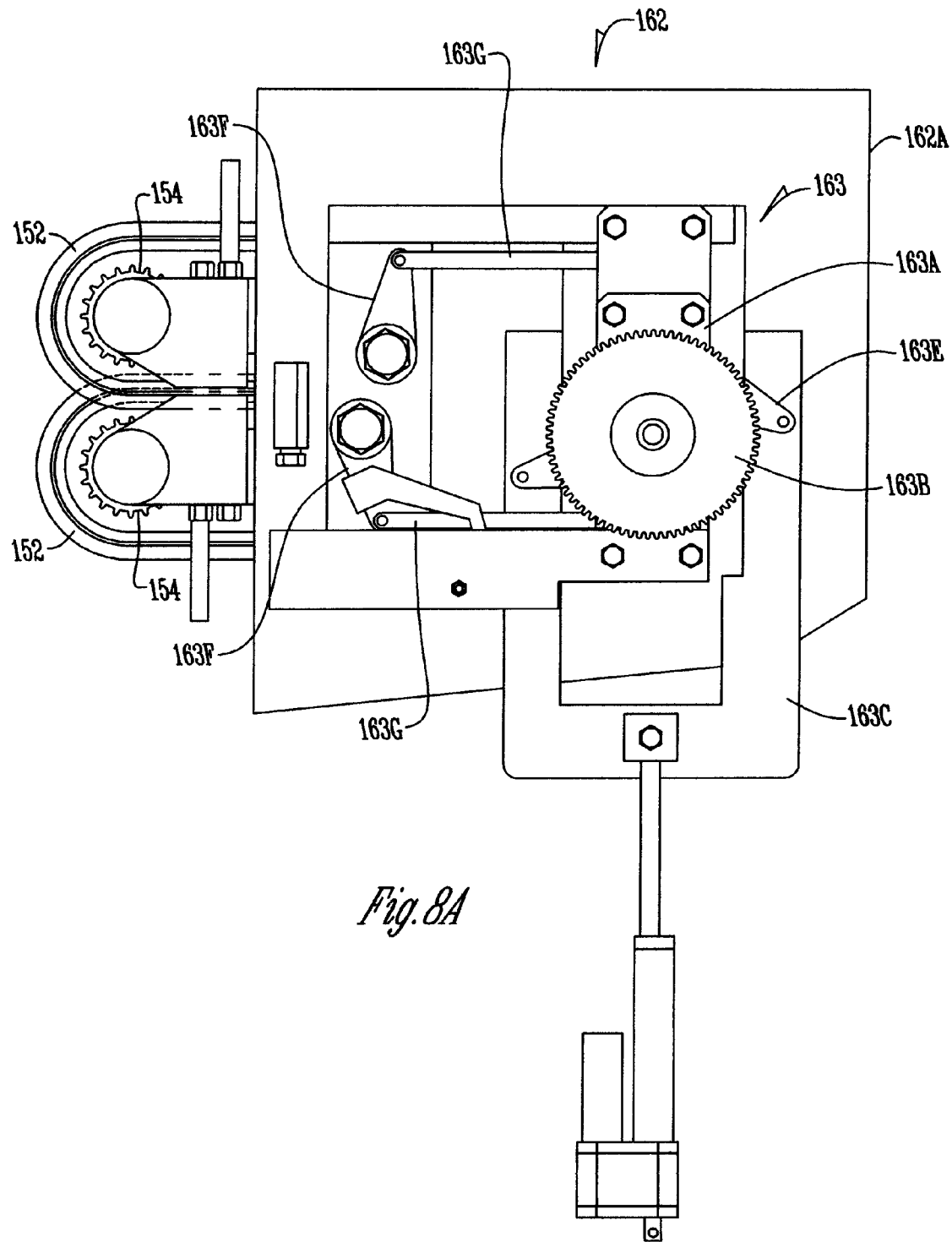
FIG. 8A is a side plan view of the linker.
Figure 8B:
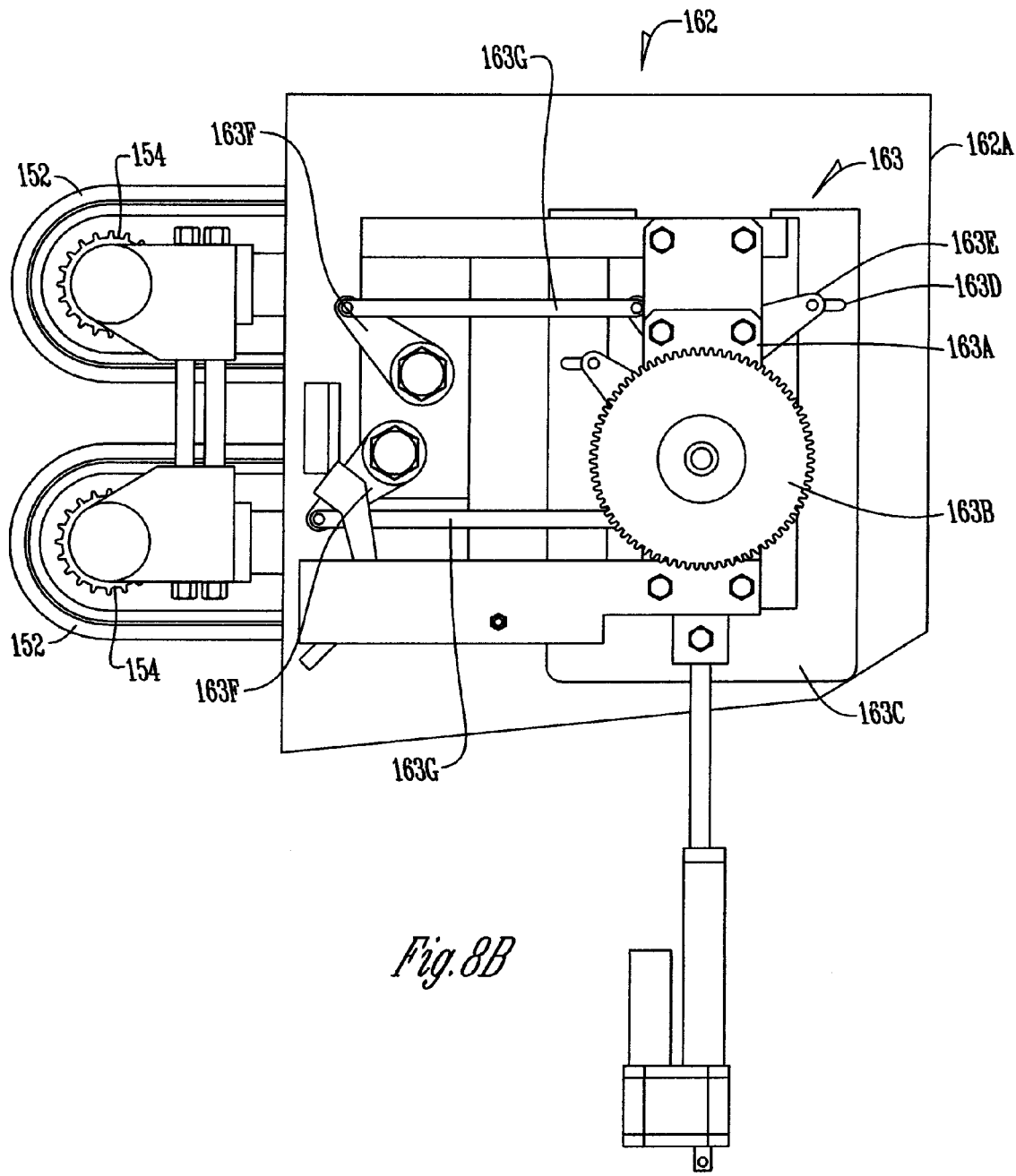
FIG. 8B is a side plan view of the linker.
Figure 9:
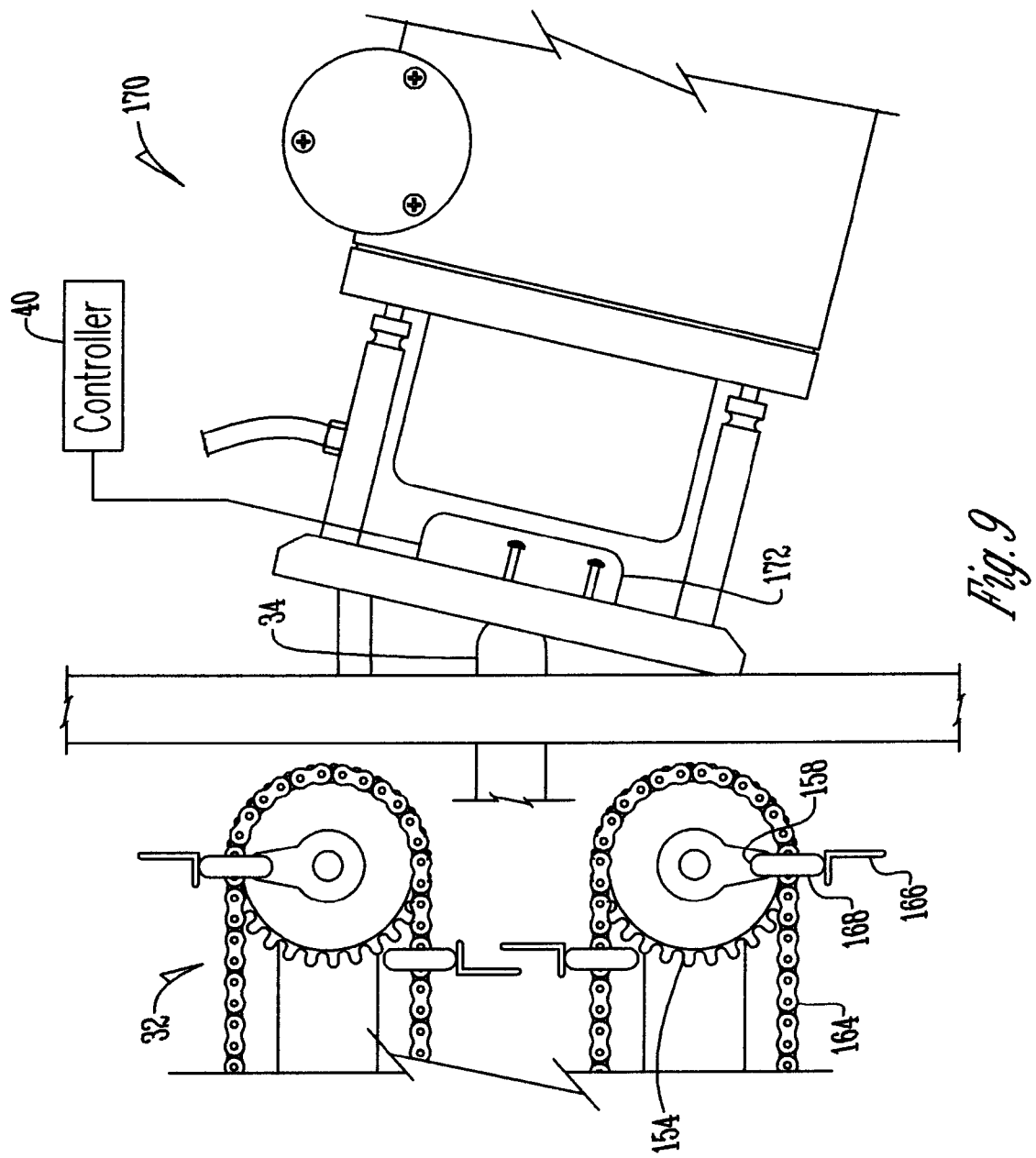
FIG. 9 is a side plan view of the process control system.
Figure 10:
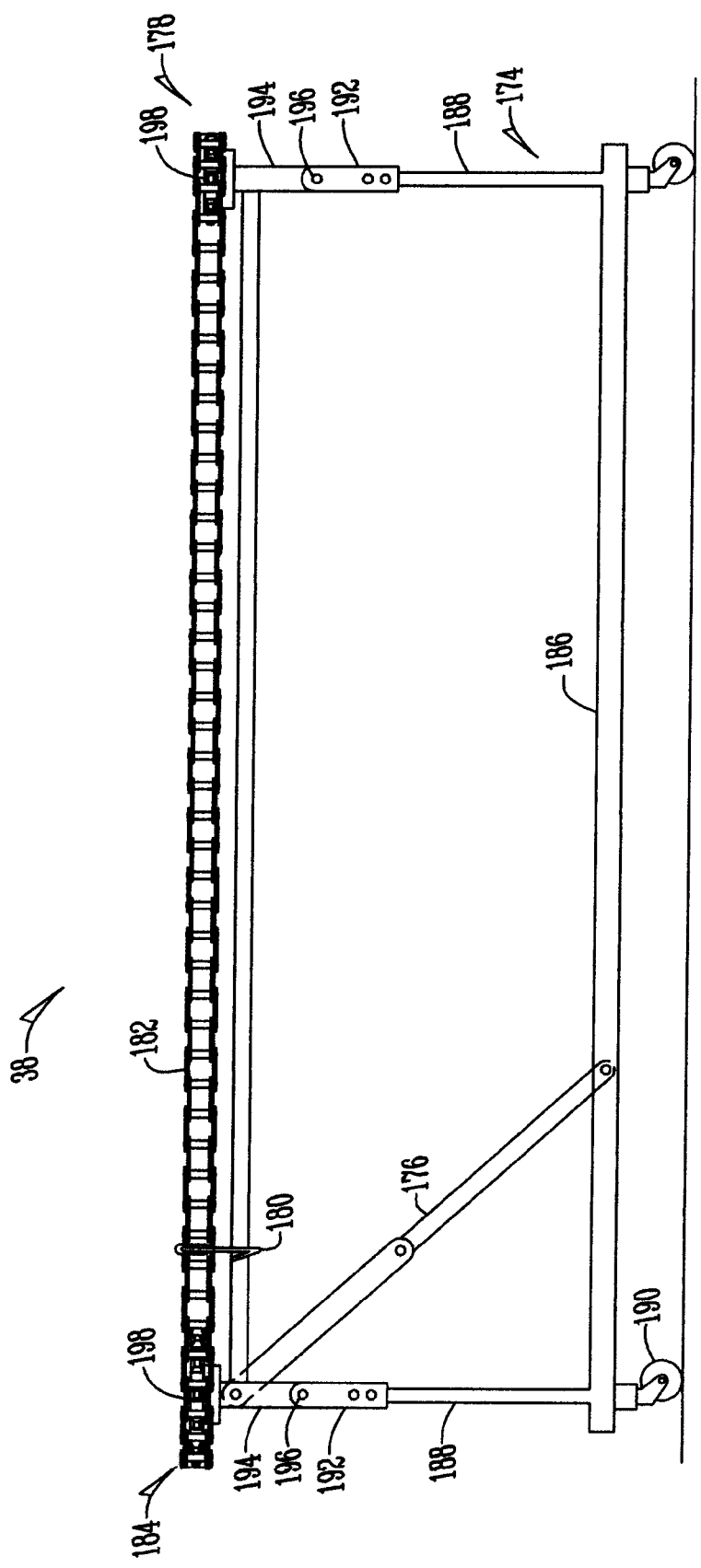
FIG. 10 is a side plan view of the adjustable conveyor of the present invention.
Figure 11:
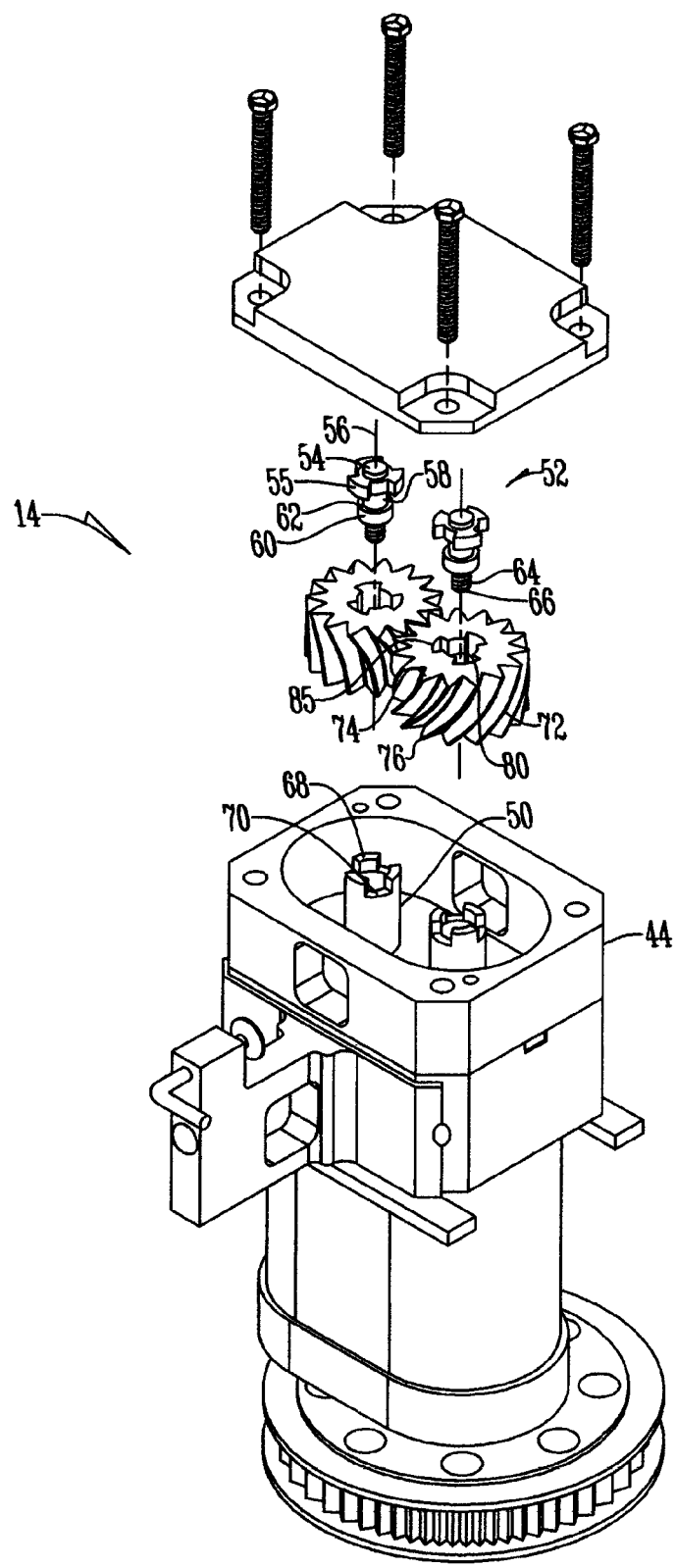
FIG. 11 is a perspective view of the pump.
Figure 12:
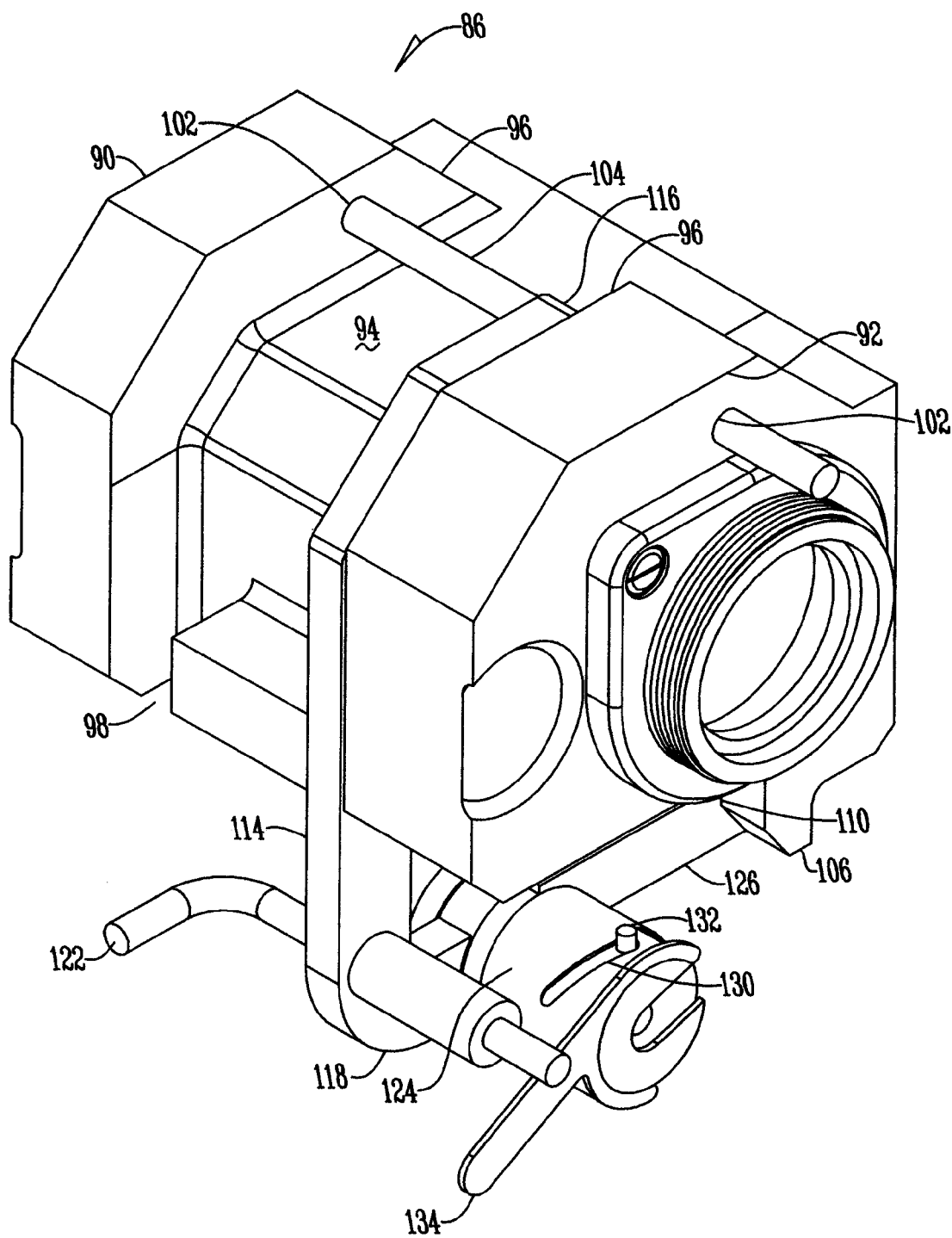
FIG. 12 is a perspective view of the horn adjustment assembly.
Figure 13:
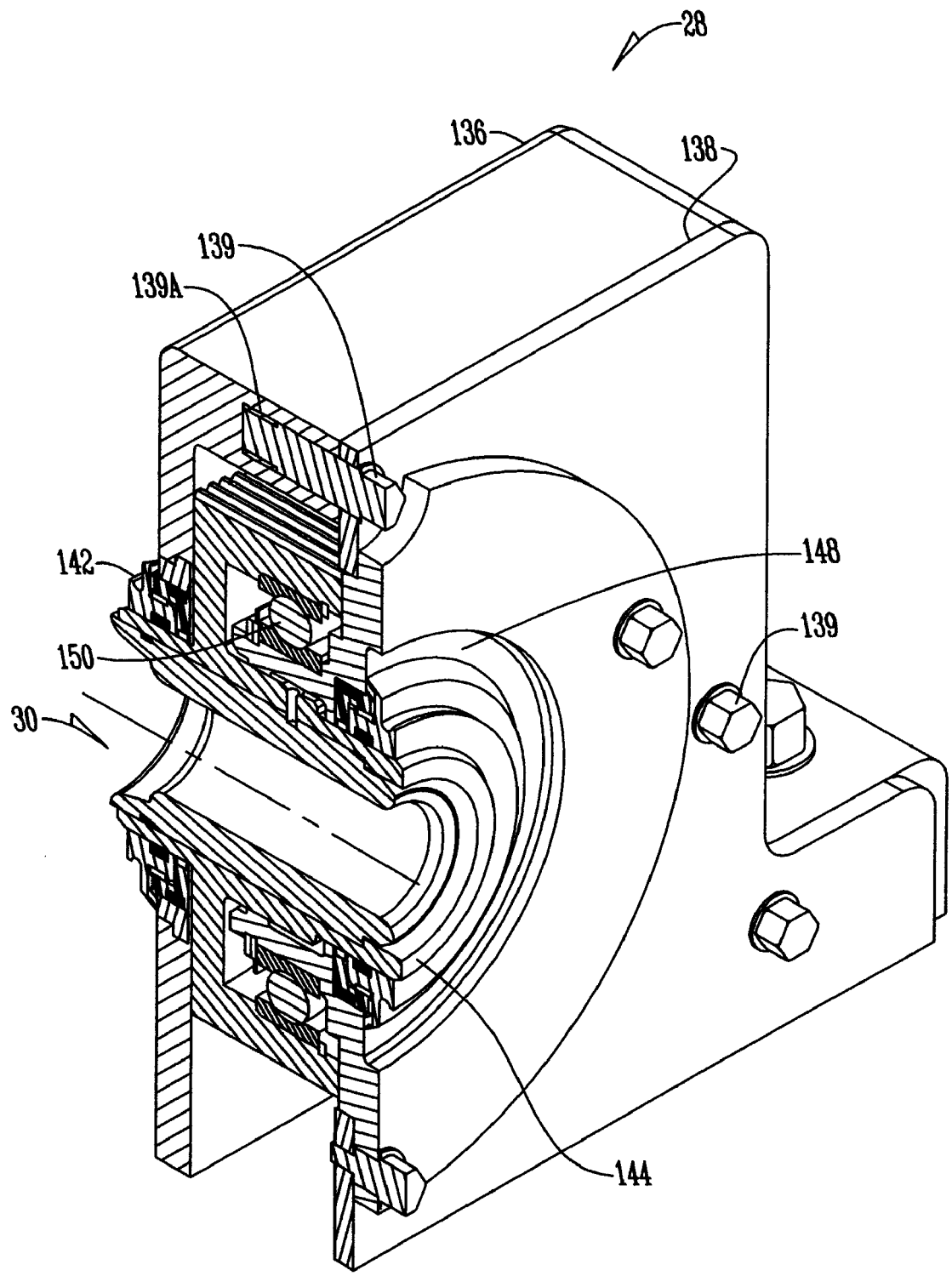
FIG. 13 is a perspective view of the chuck.
Figure 14:
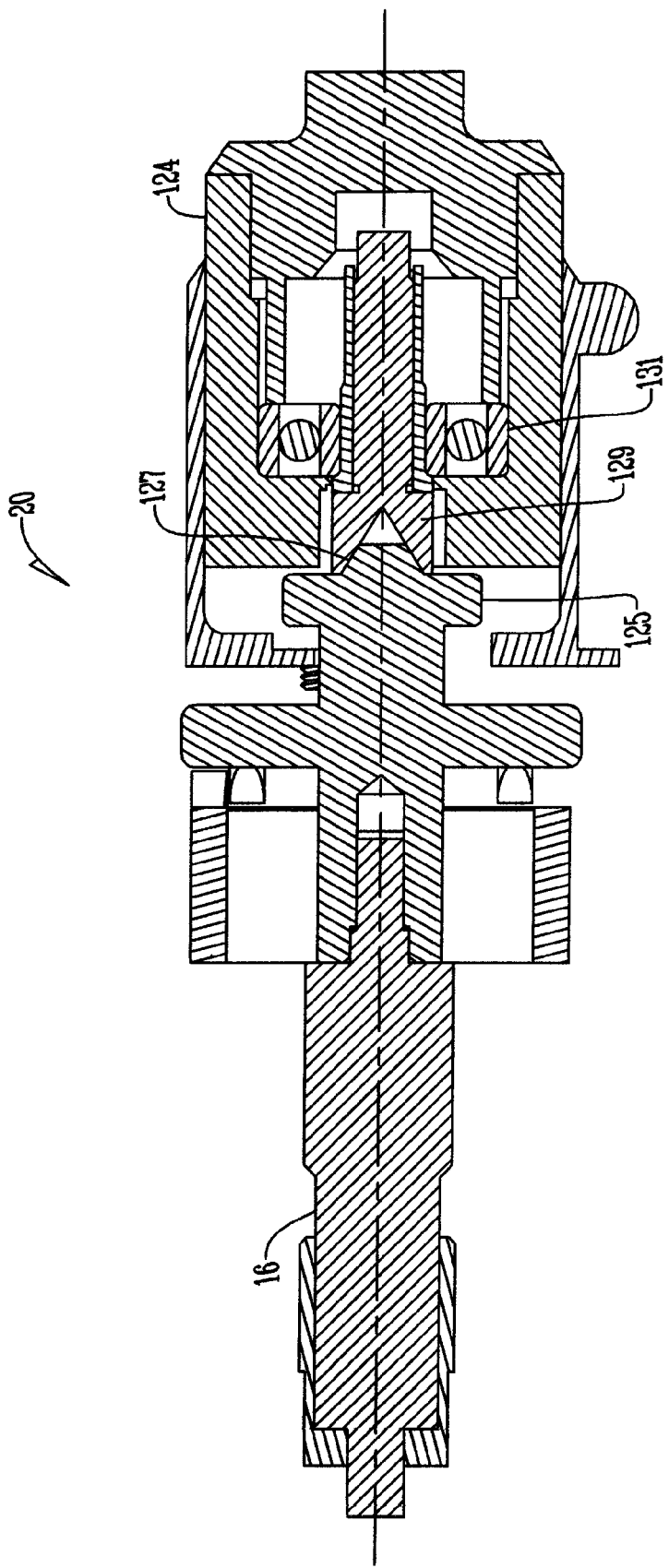
FIG. 14 is a side plan sectional view of the horn adjustment assembly.
Figure 15:
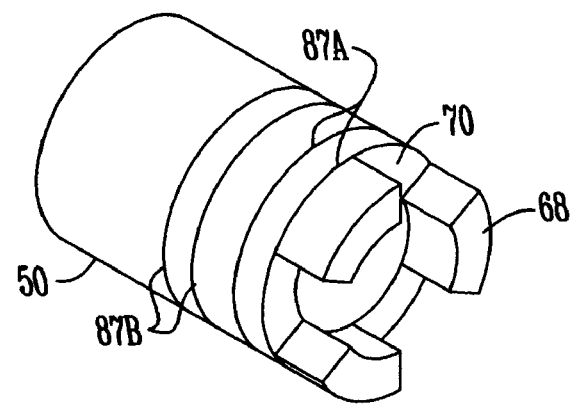
FIG. 15 is a perspective view of pump shaft.
Figure 16:
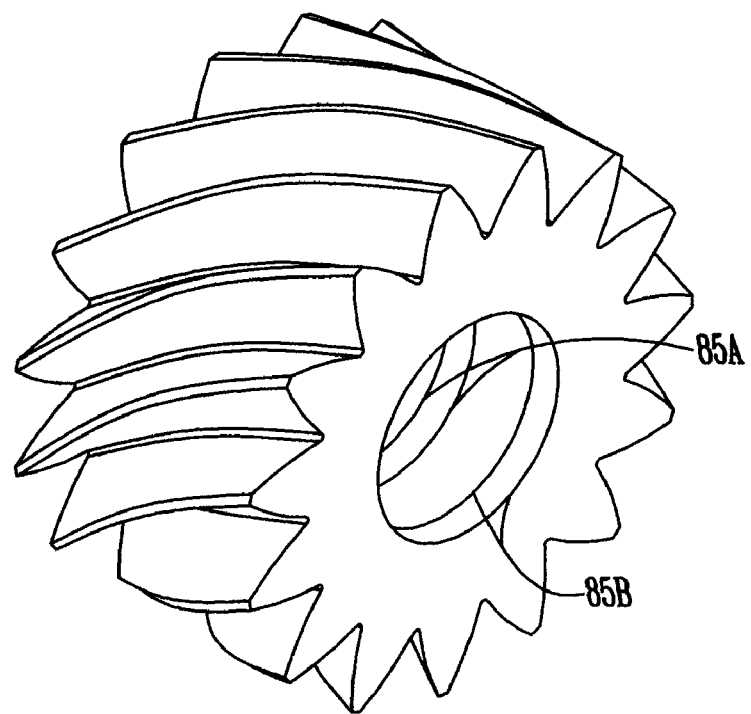
FIG. 16 is a perspective view of the pump helical gear.

Support member 162, a part of the cabinet weldment, is utilized to permit movement of the assemblies 152 toward and away from one another. The support member 162 has a frame 162A that is secured to the assemblies 152. Attached within the frame is a movement assembly 163. The movement assembly 163 has a gear box 163A that connects a drive gear 163B to the sprockets 154 through gear trains (not shown) residing in gearboxes 163A that form the rotating external arms holding the drive sprockets 154. The drive gear 163B is mounted to the gearbox 163A which is mounted to the frame 162A. A U-shaped frame 163C has a pair of slots 163D disposed therethrough so that a pair of arms 163E are slidably disposed within the slots 163D. A pair of cams 163F are secured to the support member 162 and contain cam arms 163E that are attached on either side of the gearbox 163A so that vertical movement of the U-plate 163C causes movement of the arms 163E to slide within the slots 163D of the U-shaped member 163C and coincidentally pull a first linker chain assembly 152 toward the second linker chain assembly as best shown in FIGS. 8A and 8B. Thus, this movement allows for easy removal and installation of chains as well as finite spacing changes between the upper and lower chains from the touchscreen (formerly accomplished by manually adjusting the backing plates in and out).

Mounted to the sprockets 154 are a pair of chains 164. The chains 164 have one alignment pin 168 for each chain that is positioned to be received within the alignment slots 158 of the sprockets 154 to properly align the chains 164 based on the product size.

In operation, tension on the linking chain assembly 152 is created by activation of the piston 160 by the controller 40. More specifically, based upon the product size, the controller 40, which is connected to a source of compressed air, releases air to the pistons 160 causing the pistons 160 to extend to place tension on the chains 164.

To remove a chain 164, the controller 40 releases pressure to the pistons 160. Separating the chains with the conveyor adjusted to the product length forces the piston sections to collapse and allows for removal of the chains. Manually collapsing the pistons may also be performed. Simultaneously, the vertical movement assembly 163 of the support member 162 can be used to move linking chain assemblies 152 apart from one another. In this relaxed state, the chains 164 are easily removed from the sprockets 154. To add a new chain 164, the alignment pin 168 on the chain 164 is placed in the alignment slot 158 on the sprocket 154. Once inserted, the controller 40 is activated such that the assemblies 152 move toward one another and the piston 160 extends to place tension on the chain 164. The pneumatic pistons 160 allow for mounting sets of chains 164 of different length without the need for fine tuning the backing plates.

In one embodiment, counting sausage links is done by the controller. An encoder (i.e., pulse generator) is connected to the linking chains axis and provides a pulse stream to the controller. Preferably the pulse stream is scaled so that every 20 revolutions of the linking chain sprocket is at 13,500 counts with a roll over position set at zero. The controller counts the number of times the value transitions from 13,500 to zero.

When production begins, an initial count or snapshot is taken and stored in the controller for later calculation. As the device operates, pulse streams are sent to the controller and transitions through a set number (i.e., 1350) are counted by the controller. When production stops a second count or snapshot is taken and stored. The number of counts is calculated from this information. The total number of counts divided by the counts per sausage produces a sausage count for the just completed sausage strand.

In another embodiment, counting sausage links is done with help from a sensor and the controller. The strand flow of the sausage is monitored by the sensor, wherein the software allows the sensor and controller to count the number of links in the strand of sausages, track the length of the individual segments of sausage in between successive links, and monitor the diameter and contour of the strand of sausages.

The controller 40 is also in electronic communication with the sausage encasing machine such that the controller 40 has the ability to slow down, speed up, or stop the machine based upon the output signal from the sensor 172 to maintain that the completed strand of sausages conforms to the desired standards. If the controller 40 determines that the space in between successive links in the strand 34 of sausages is too short (the sensed occurrence of links is sensed too frequently), the controller speeds up operation of the sausage encasing machine to lengthen the individual segments of sausage. Conversely, if the controller 40 determines that the space in between successive links in the strand of sausages is too long (the sensed occurrence of links is sensed too infrequently), the controller 40 slows down operation of the sausage encasing machine to lengthen the individual segments of sausage. If the controller 40 determines that no links are present in the chain of sausages for a predetermined amount of time, controller determines that a break in the casing has occurred and controller will shut down sausage encasing machine. The controller 40 also will shut down, or alternatively, alter the operation of the sausage encasing machine if the controller determines that the diameter of the strand 34 of sausages is either too large or too small. In addition, at the end of the strand 34, the controller 40 will speed up or slow down the conveyor 34 based upon the links remaining after the last full loop so as to form a smaller or larger loop to catch and secure the strand over a hook.

In another embodiment, a pneumatic flow sensor on the exhaust of the follower cylinder provides input to the controller. This information, in conjunction with other operating parameters, is used to determine whether proper feeding of the casing into the chuck is occurring. An undesirable situation, such as but not limited to casing wrapping on the stuffing horn, will interrupt the expected flow through the sensor, allowing the controller to pause or stop production and inform the operator of a problem.

The adjustable conveyor 38 includes a frame 174, an adjustment member 176, and an operating platform 178. The operating platform 178 is supported by the frame 174, and includes hooks 180 driven by a chain 182 which rotate around the periphery of the operating platform 178. The conveyor lays in a horizontal or vertical frame. At one end of the operating platform is a loading point 184 adjacent to the output end of a sausage encasing machine where a completed, looped strand 34 of sausages is loaded onto hooks 180.

The lower section of the frame has a base 186 with support members 188 extending upwardly therefrom. In one embodiment, wheels 190 are provided on the bottom of the base 186. The upper section of the frame includes sleeves 192 adjustably mounted onto each of the four support members 188 of the lower section of the frame to allow the operating platform 178 to be raised or lowered. The upper section additionally includes segments 194, each segment having a bottom end 196 pivotably mounted to each sleeve and a top end 198 pivotably mounted to the operating platform 178.

The adjustment member 176 causes the segments 194 to rotate or pivot to adjust the position of the operating platform 178. In one embodiment the adjustment member 176 is a turnbuckle. The turnbuckle is connected at a bottom end to the base 186 and at a top end to the top end of one of the segments 194. Alternatively, the top end of the turnbuckle 176 is connected to the operating platform 178. Rotation of the turnbuckle in one direction causes the turnbuckle 176 to telescope inward, and rotation of the turnbuckle 176 in the opposite direction causes the turnbuckle 176 to telescope outward, thereby rotating each segment radially in unison to adjust the position of the operating platform. As such, the loading point 184 is easily aligned with the output end of the linking chains.

Alternatively, the platform adjustment member is any device which would cause the segments, and, accordingly, the operating platform to rotate, including but not limited to a motor mounted to at least one segment, a ratcheting mechanism, or a pneumatic or hydraulic cylinder.

What is claimed is:

1. A process control system, comprising:
    a sensor mounted to a linker and positioned to sense a strand of processed meat as the strand exits the linker;
    the sensor is connected to a controller such that the sensor transmits sensed data to the controller;
    the controller controls the operation of a meat processing assembly based upon the sensed data; and
    wherein the strand is formed into loops and at an end of the strand of processed meat the speed of a conveyor is adjusted by the controller based upon the links remaining after a last full loop of the strand of processed meat.

2. The system of claim 1 wherein the controller counts the number of links in the strand of sausage based upon the sensed data.

3. The system of claim 1 wherein the system has software which allows the sensor and controller to track length of individual segments of meat between successive links of the strand of processed meat.

4. The system of claim 1 wherein the system has software which allows the sensor and controller to monitor the diameter of the strand of processed meat.

5. The system of claim 1 wherein the controller is in electronic communication with a sausage encasing machine.

6. The system of claim 5 wherein the controller adjusts the speed of the sausage encasing machine based on the sensed data transmitted by the sensor.

7. The system of claim 5 wherein the controller stops the sausage encasing machine based on the sensed data transmitted by the sensor.

8. The system of claim 5 wherein when the controller determines that distance between successive links in the strand of processed meat is too short the controller speeds operation of the sausage encasing machine to lengthen distance between successive links in the strand of processed meat.

9. The system of claim 5 wherein when the controller determines that distance between successive links in the strand of processed meat is too long the controller slows operation of the sausage encasing machine to shorten distance between successive links in the strand of processed meat.

10. The system of claim 5 wherein when the controller determines that no links are present in the strand of processed meat for a predetermined amount of time the controller stops operation of the sausage encasing machine.

11. The system of claim 5 wherein when the controller determines that diameter of the strand of processed meat is too large or too small the controller alters the operation of the sausage encasing machine.

12. A process control system, comprising:
    a sensor mounted to a linker and positioned to sense a strand of processed meat as the strand exits the linker;
    the sensor is connected to a controller such that the sensor transmits sensed data to the controller;
    the controller controls the operation of a meat processing assembly based upon the sensed data;
    wherein the controller is in electronic communication with a conveyor having a plurality of hooks;
    wherein the strand of processed meat is separated into a plurality of loops which are hung over one of the plurality of hooks, each loop having a plurality of links;
    wherein the controller adjusts the speed of the conveyor at an end of the strand of processed meat so as to secure a smaller or larger loop is hung over a hook; and
    wherein at an end of the strand of processed meat the speed of a conveyor is adjusted by the controller based upon the links remaining after a last full loop of the strand of processed meat.

* * * * *